United States Patent [19]

Chan

[11] Patent Number: 4,549,288
[45] Date of Patent: Oct. 22, 1985

[54] APPARATUS FOR ENHANCING THE PLAYBACK SIGNAL IN AN OPTICAL DATA RECORDING SYSTEM

[75] Inventor: Albert Y. Chan, River Vale, N.J.

[73] Assignee: North American Philips Corporation, New York, N.Y.

[21] Appl. No.: 450,837

[22] Filed: Dec. 20, 1982

[51] Int. Cl.⁴ ............................................. G11B 7/00
[52] U.S. Cl. ...................................... 369/48; 369/59; 369/76; 369/107
[58] Field of Search ...................... 358/336, 339, 342; 369/47, 48, 59, 76, 107, 109, 54, 58, 106, 116

[56] References Cited

U.S. PATENT DOCUMENTS

| | | | |
|---|---|---|---|
| 3,988,531 | 10/1976 | Laub | 369/48 X |
| 4,142,208 | 2/1979 | Oprandi et al. | 369/48 X |
| 4,225,873 | 9/1980 | Winslow | 369/54 X |
| 4,397,011 | 8/1983 | Ogawa | 369/50 |

Primary Examiner—Robert L. Richardson
Attorney, Agent, or Firm—Robert T. Mayer

[57] ABSTRACT

Optical data recording apparatus which enhances a playback signal by comparing the lengths of the lands on a recording medium with the lengths of the pits on it and changes the playback signal to represent equality between such lengths.

5 Claims, 6 Drawing Figures

APPARATUS FOR ENHANCING THE PLAYBACK SIGNAL IN AN OPTICAL DATA RECORDING SYSTEM

This invention relates to apparatus for optically recording information on a recording medium with a beam of radiation. In particular, it relates to an apparatus wherein the medium undergoes an optically detectable change upon exposure to the beam.

In known optical recorders, the information is recorded by a laser beam on a recording medium, which typically is a rotating disc provided with a radiation sensitive layer. The intensity of the laser beam is modulated in accordance with the information to be recorded so that the beam forms, on the rotating disc, a series of micron-sized, spaced apart data spots which differ optically from the surrounding medium. Although various types of data registry layers have been proposed, the one most commonly used is a thin, reflective metallic film in which the data spots are pits melted by the laser beam. During recording, the beam is moved radially across the rotating disc so that the data spots are arranged in a plurality of radially spaced tracks.

In an optical recording produced in this manner, the information is encoded in a sequence of data spots and intermediate areas by which the data spots are spaced apart in the track direction. In the case of digital data, for example, a data spot may represent a "one" and an intermediate area or land a "zero" or vice versa.

The information recorded on the recording medium is read by scanning the tracks with a low intensity laser beam. In the case of a metallic registry layer, for example, the reflectivity of the pits is less than that of the intervening lands. The intensity of the radiation reflected from the disc is, therefore, modulated in accordance with the spatial distribution of the pits and lands along the track enabling the information stored in the pit/land pattern to be recovered upon detection of the reflected radiation.

Various types of error detection correct for errors caused by gross defects in the recording medium. Also, apparatus has been developed to ensure that the data signal is mapped accurately into the spatial pit/land pattern on the disc. For example, in the case of constant angular velocity recording, the linear velocity at the disc periphery is considerably higher than the linear velocity at the disc center. Hence, if the recorded information is to be readout at a constant data rate, the length of a pit representing a given bit or combination of bits will have to be shorter at the central portion of the disc than the length of the corresponding pit at the periphery. The laser power and/or the pulse length of the modulating signal is adjusted in dependence on the radial distance during recording of the information.

It is to be understood that pit formation in the disc is a thermodynamic process which depends in a complex way on a large number of parameters such as the energy density and distribution in the write beam, the physical properties of the recording layer, exposure time, the length of the pit that is formed and the like. All this can lead to playback signals that do not reflect the data being recorded accurately enough.

It is an object of the invention to enhance the playback signals of optical recordings.

One of the advantages of the invention is that it produces playback signals that more accurately represent data stored in optical recordings.

One of the features of the invention is that it monitors pit and land lengths over relatively long periods and changes the playback signal if such lengths are not substantially equal throughout those periods.

In accordance with the invention, there is provided apparatus for enhancing the playback signal in an optical recording system in which a read beam impinges on a record carrier having data stored on it in the form of pits and lands. In response to the read beam impinging on the pits and lands the system produces a signal which alternates in magnitude in accordance with the pits and lands. The apparatus includes clipping means clipping the alternating signal to produce signal pulses representative of the lands and pits as well as pulse converting means converting the signal pulses into two sawtooth waves, one having amplitudes representing the lengths of the pits, the other having amplitudes representing the lengths of the lands. Comparator means compares one sawtooth wave with the other and produces an error signal which a feedback means uses to improve the alternating signal so that it represents the data more accurately.

Other objects, features and advantages will become apparent, to those skilled in the art from the following description and appended claims when considered in conjunction with the accompanying drawing in which:

Figure 1:
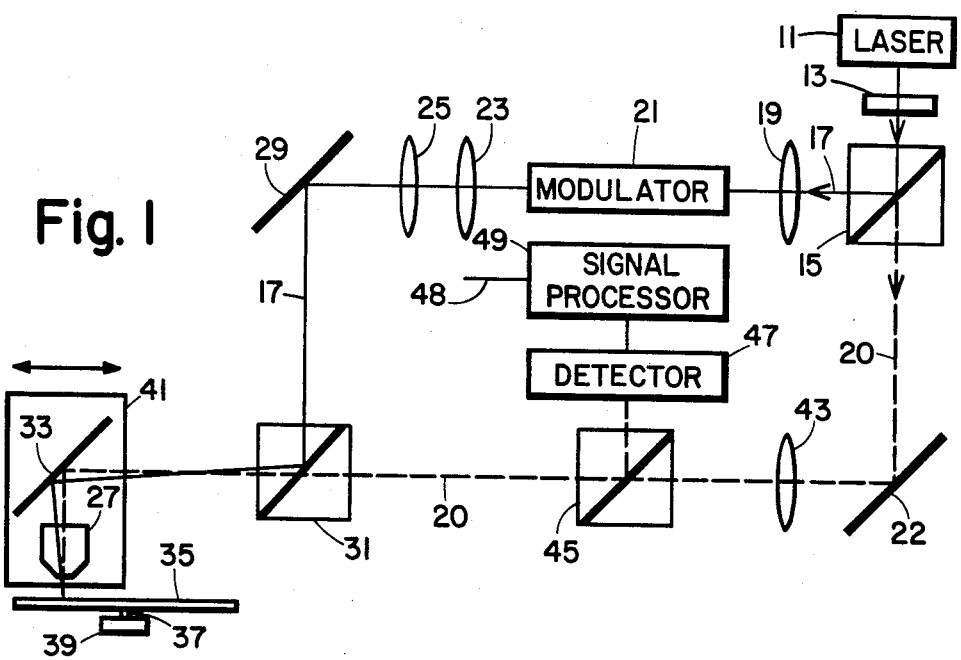
FIG. 1 shows optical recording apparatus in accordance with the invention.

In accordance with the preferred embodiment shown in FIG. 1, the apparatus includes laser 11 which produces a plane polarized radiation beam. The laser may, for example, be a HeCd laser emitting about 50 milliwatts at a wavelength of 4416 Å. The laser beam is elliptically polarized by a polarizer such as half-wave plate 13. Beam splitting prism 15 splits the laser beam into two orthogonally polarized beams, namely, write beam 17 which is reflected toward lens 19 and read beam 20 which is transmitted toward mirror 22.

Write beam 17 is focussed by lens 19 to a narrow beam waist at the input of an acousto-optic modulator 21. The beam emerging from modulator 21 is collimated by lenses 23 and 25 which, in addition, expand the beam so that it fills the objective 27, described later. The lenses 23 and 25, and modulator 21 are arranged so that when the modulator is passive, light exits it at an angle with respect to the optical axis so as to miss the aperture of lens 23. Upon application of a high frequency electrical signal to the modulator, light is diffracted along the optical axis and into the aperture of lens 23. The intensity of write beam 17 may thus be modulated by exciting the modulator with a series of pulses corresponding to the data to be recorded. The varying intensity of the resulting write beam is proportional to the amplitudes of these pulses.

From lens 25 collimated write beam 17 passes to mirror 29 which directs it to beam splitter 31. Beam splitter 31 reflects write beam 17 onto mirror 33. Mirror 33 reflects write beam 17 through objective 27 which focuses the beam onto disc 35.

Disc 35 is supported on spindle 37 and is rotated by drive motor 39. Objective 27 and mirror 33 are arranged on sled 41, which is mounted in any well known manner for movement radially across disc 35. In a constructed embodiment of the apparatus, an objective with a numerical aperture of 0.68 was used to focus the write beam produced by the HeCd laser to spots of approximately 0.6 μm measured at full-width-half-maximum (FWHM). The disc may preferably be of the construction described in U.S. Pat. No. 4,074,282 in which the recording layer is a tellurium alloy film deposited on a clear glass or plastic substrate. A second disc-shaped substrate is hermetically secured in a spaced apart relationship to the first substrate so as to enclose the tellurium alloy film in a dust free atmosphere enabling the recording to be performed without the need for a clean room.

During recording, the intensity of write beam 17 is modulated by A/O modulator 21 which is driven by a multi-level data signal, the "zero" level of the signal corresponding to a land and the levels higher than that which initiates pit formation corresponding to pits. As stated previously, the NRZ digital data to be recorded may preferably be encoded in accordance with one of a number of coding schemes such that the data signal used to drive the A/O modulator is comprised of pulses of different lengths, each representing a specific combination of data bits.

As write beam 17 is modulated by data, disc 35 is rotated by drive motor 39 so that the beam, as is well known, melts pits (not shown) in the tellurium film of the disc. As is also well known, optical sled 24 can be moved radially across the disc at a uniform rate of speed during writing so that the pits form data tracks radially spaced from each other in a continuous spiral on the surface of the disc. Alternatively, the optical sled may be moved radially in discrete steps, one per each revolution of the disc, so that the tracks form a plurality of radially spaced concentric circles. With a 0.6 μm write spot, the width of the resultant pits is approximately 0.8 μm so that a radial spacing of approximately 1.6 μm between the centers of adjacent tracks is sufficient to reduce cross-talk to acceptable levels during readout of the information.

Read beam 20 is reflected by mirror 22 through a spot lens 43 which expands the beam so that it fills objective 27 when it reaches it. Before that, it passes through a partially transmissive mirror comprising non-polarization sensitive beam splitter 45. It also passes through polarization sensitive beam splitter 31 and impinges on mirror 33. Mirror 33 reflects read beam 20, as well as write beam 17, onto disc 35. The apparatus is arranged, in any well known manner, so that read beam 20 is angularly separated from write beam 17 so as to trail it in the direction of the data tracks. In this way, the read spot (not shown) impinges on the pits and lands in the tracks slightly after the write spot (not shown).

The read and write beams incident on disc 35 are reflected back through objective 27 to mirror 33 which deflects the radiation to polarization sensitive beam splitter 31. Because both beams are reflected from the disc in their initial polarization states, the reflected radiation of the write beam 17 is directed by beam splitter 31 toward mirror 29, upon which it impinges without effect for purposes of this disclosure. In the meantime, orthogonally polarized reflected radiation of read beam 20 passes through splitter 31 and impinges on beam splitter 45. This deflects the radiation onto detector 47. The reflectivity of the pits is substantially lower than that of the intervening lands and, therefore, the intensity of the reflected read beam is modulated in accordance with the pit/land pattern inscribed in the track by write beam 17. The modulated radiation incident on detector 47, which may be a photodiode or an array of photodiodes, is converted into an electrical signal representative of the modulation of the reflected read beam and, hence, of the spatial pit/land pattern on the disc.

The signal from the photodetector 47 is fed to signal processor 49 where it is limited, amplified and processed to obtain a playback signal along line 48. This signal is representative of the pit/land pattern recorded on the disc. Ideally, the playback signal should be the same as the original data signal used to drive modulator 21. However, because of the factors discussed earlier, such as variations in the sensitivity or thickness of the data layer and the like, the pit/land pattern inscribed on the disc may not in practice accurately represent the input data signal used to drive the A/O modulator so that the playback signal at the output of the signal processor 49 will not be identical to the input data signal. For example, it has been found that if the write beam is modulated with a perfectly square wave, this will not necessarily produce a perfectly symmetrical pit/land pattern on the disc. Accordingly, it is necessary to enhance the recovered data to ensure that it accurately represents the input data.

Figure 2:
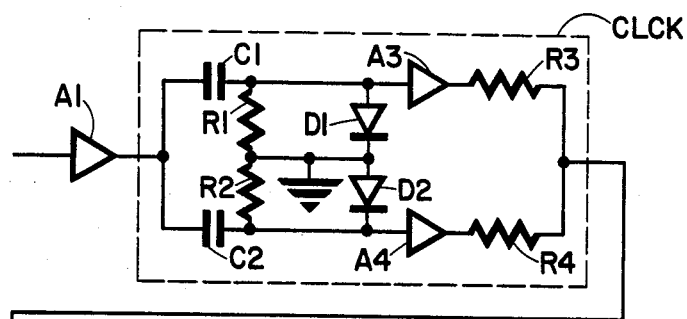
FIG. 2 shows a signal processor used in the apparatus of FIG. 1.
Figure 2:
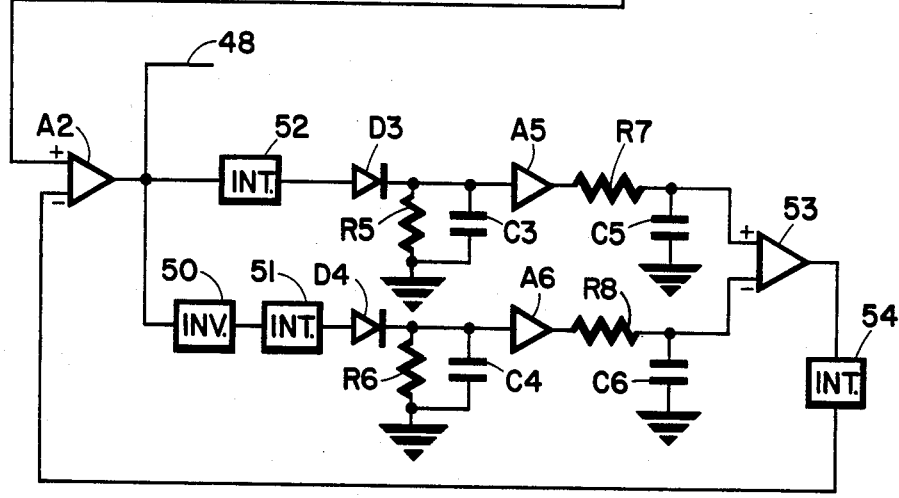
Figure 3A:
FIGS. 3a, 3b, 3c and 3d show waveforms of signals produced by the processor of FIG. 2.

In accordance with the invention, the playback signal is enhanced by feeding the signal from detector 47 through amplifier A1 (FIG. 2) and to clamping circuit CLCK (FIG. 2). This circuit comprises capacitors C1 and C2 connected by resistors R1 and R2 to ground. Also connected to ground in parallel with resistors R1 and R2 are a matched pair of diodes D1 and D2. Capacitor C1, resistor R1 and diode D1 serve as a positive clamping circuit to clamp the positive portion of the alternating signal from detector 47. In one embodiment this voltage was approximately 0.5 volts, the diode voltage drop. Similarly, capacitor C2, resistor R2 and diode D2 serve as a negative clamping circuit to clamp the negative portion of the alternating signal from detector 47. In the forementioned tested embodiment this voltage was approximately −0.5 volt. These positive and negative clamping circuits together with buffer amplifiers A3 and A4 and output resistors R3 and R4 apply a signal at the positive input of comparator A2 which in response produces an output signal as illustrated by the square wave pulses shown in FIG. 3a. Clamping circuit CLCK and comparator A2 together form what can be referred to as a clipping means.

Figure 3B:
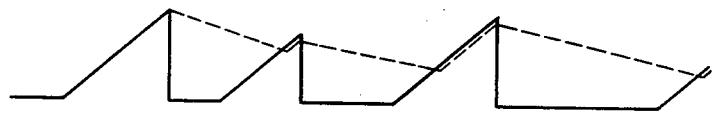
Figure 3C:
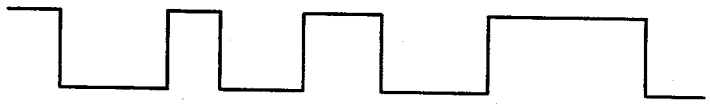
Figure 3D:
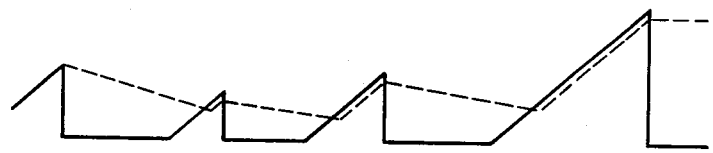

The pulse signals from clamping circuit CLCK are transmitted by comparator A2 to inverter 50 at the output of which is produced the square wave pulses shown in FIG. 3c. These and the pulse signals from comparator A2 are applied to integrating circuits 51 and 52, respectively, which at their outputs produce the solid line sawtooth waveforms shown in FIGS. 3d and 3b, respectively. These waveforms are rectified through diodes D3 and D4 and detected by parallel resistor-capacitor circuits R5, C3 and R6, C4. The results of this signal processing are fed to amplifiers A5 and A6, the outputs of which are applied through resistors R7 and R8 and stored by capacitors C5 and C6. The signal at capacitors C5 is shown by the dotted line sawtooth waveform of FIG. 3d. It is applied to the upper input of differential amplifier 53. The signal at capacitor C6 is shown by the dotted line sawtooth waveform of FIG. 3d. It is applied to the lower input of differential amplifier 53. The output of amplifier 53 is a difference signal representing the difference between its two inputs. This signal is integrated by integration circuit 54 whose output is fed back to the negative input of comparator A2.

In this manner, the transitions of the output signals of comparator A2 will correspond more accurately to the boundaries of pits and lands of the disc being read.

The operation of the disclosed apparatus involve the detection of the modulated read signal by detector 47 (FIG. 1) to produce an alternating signal which alternates in accordance with the pits and lands on a record carrier. This signal is applied to clamping circuit CLCK (FIG. 2) which in response thereto produces signal pulses (FIG. 3a) at the output of comparator A2 representative of the lands and pits. These pulses are applied to a pulse converting means comprising integrating circuit 52 as well as inverter 50 and integrating circuit 51. Integrating circuit 52 produces the sawtooth wave shown in solid line in FIG. 3b. The amplitudes of this sawtooth wave represent the lengths of the pits on the record.

In response to the pulses from comparator A2, inverter 50 produces pulses as shown in FIG. 3c. These are applied to integrating circuit 51 which in response produces the sawtooth wave shown in solid line in FIG. 3d. The amplitudes of this sawtooth wave represent the lengths of the lands on the record. The two sawtooth waves from integrating circuits 51 and 52 are applied to peak detecting circuits comprising diodes D3 and D4, resistors R5 and R6 and capacitors C3 and C4. The outputs of these circuits are amplified by amplifiers A5 and A6 and applied through resistors R7 and R8 and stored on capacitors C5 and C6. These signals each represent the average of its respective sawtooth waveform and are compared in differential amplifier 53. It is understood that over a predetermined period of time data stored on a record carrier in lands and pits is such that the lengths of the lands on the record carrier should equal the lengths of the pits. If this is so, the output signal from amplifier 53 represents the error in the playback signal if the cumulative length of the lands appears longer than the cumulative length of the pits or vice versa. By integrating this signal through integrating circuit 54 and feeding it back to the negative input of comparator A2 the zero crossing is varied such that the output signal from comparator A2 more accurately represents the data stored on the record carrier. This is accomplished by the comparator circuit producing pulse signals which increase to represent longer pits or decrease to represent longer lands, as is indicated to be desirable by the error signal from amplifier 53.

It is understood that various modifications to the above described arrangement of the invention will become evident to those skilled in the art. For that reason, the arrangement described herein is for illustrative purposes only and is not to be considered restrictive.

What is claimed is:

1. Apparatus for enhancing the playback signal in an optical recording system in which a read beam impinges on a record carrier having data stored on it in the form of pits and lands, said system producing in response to said read beam impinging on said pits and lands a signal which alternates in accordance therewith; said apparatus including clipping means clipping said alternating signal to produce signal pulses representative of said lands and pits; pulse converting means converting said signal pulses into two sawtooth waves, one having amplitudes representing the lengths of said pits, the other having amplitudes representing the lengths of said lands; comparator means comparing said one sawtooth wave with said other and producing an error signal; and feedback means using said error signal to improve said alternating signal so that it represents said data more accurately.

2. Apparatus according to claim 1, wherein said comparator means includes a separate peak detector circuit for each sawtooth wave, each peak detector circuit operating in response to its individual sawtooth wave and producing a signal representing an average thereof and said comparator means including a differential amplifier receiving each of said average signals and producing said error signal in response thereto.

3. Apparatus according to claim 2, wherein said pulses converting means includes a separate integrating circuit for each of said signal pulses, each of said integrating circuits producing a different one of said sawtooth waves.

4. Apparatus according to claim 3, wherein said pulse converting means includes an inverter connected to the input of the integrating circuit producing the sawtooth wave associated with said lands, said inverter receiving said signal pulses from said clipping means.

5. Apparatus according to claim 4, wherein said feedback means includes an integrator receiving said error signal and applying its integrated output to said clipping means.

* * * * *